Figure 2:
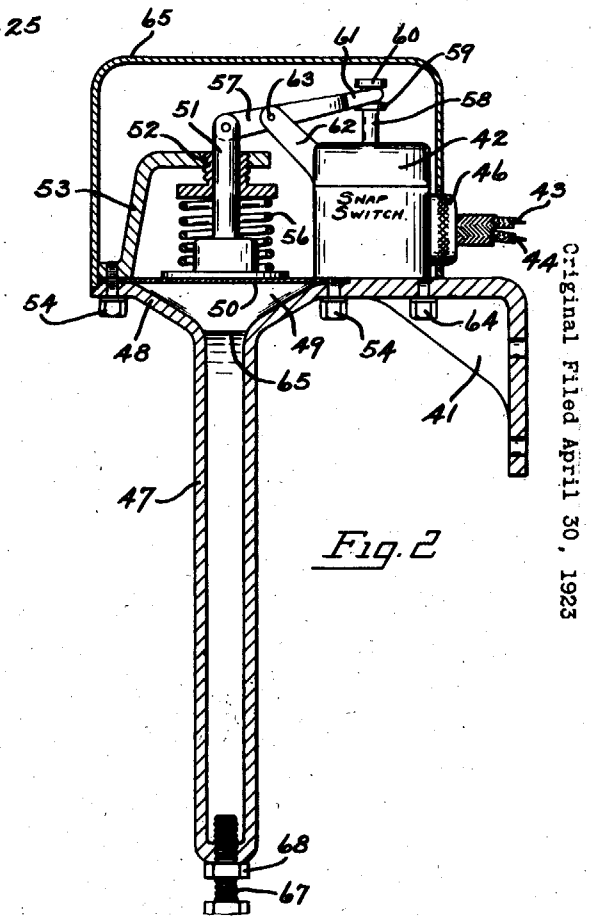

H. B. HULL

Aug. 18, 1931. REFRIGERATING APPARATUS Re. 18,154

Original Filed April 30, 1923

Witnesses
Lloyd M. Keighley
F. J. Hardman

Inventor
Harry B. Hull.
By J. Ralph Fehr
His Attorney

Reissued Aug. 18, 1931

Re. 18,154

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Original No. 1,768,600, dated July 1, 1930, Serial No. 635,521, filed April 30, 1923. Application for reissue filed July 8, 1931. Serial No. 549,525.

The present invention relates to temperature responsive apparatus particularly adapted for controlling refrigerating apparatus.

One of the objects of the present invention is to render refrigerating apparatus operative in response to increase in temperature in a cooling chamber and to render it inoperative when the temperature has been reduced to a certain extent. The disclosed form of the invention provides an electric switch for controlling a motor for operating the refrigerating apparatus, the switch being opened by a spring and closed by the freezing of a body of liquid located in the cooling chamber.

Further objects and advantages of the present invention will be apparent from the following description, reference being had to the accompanying drawings, wherein a preferred embodiment of one form of the present invention is clearly shown.

Figure 1:
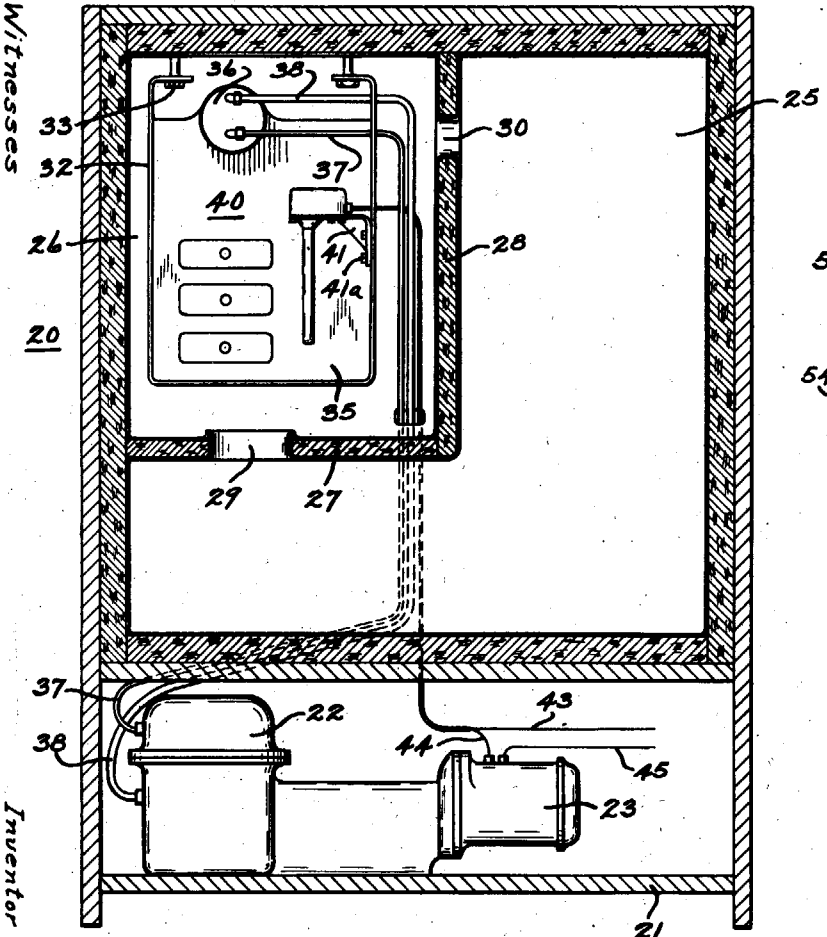

In the drawings:

Fig. 1 is a sectional view of a cabinet containing refrigerating apparatus in which the present invention is associated; and Fig. 2 is a sectional view of the controller.

The present invention contemplates the use of a controller having a liquid reservoir, the controller being located in a portion of the refrigerator which is cold enough to freeze the liquid to cause the expansion of same to operate a controller switch for an electric motor used for driving the compressor of the refrigerator.

Referring to the drawings, a refrigerator cabinet 20 is provided with a machine compartment base 21 on which a compressor and condenser 22 and an electric motor 23 for driving the same are carried. The compressor, condenser, and motor assembly is similar to that shown in the patent to Bechtold and Mellows, No. 1,276,612, patented August 20, 1918. The refrigerator also comprises a food compartment 25 and a brine tank compartment 26 insulated from the walls of the cabinet. The compartments 25 and 26 are separated by a horizontal wall 27 and a vertical wall 28 each having inter-communicating passages 29 and 30 respectively. A brine tank cradle 32 is bolted to the refrigerating cabinet by bolts 33. Cradle 32 carries a brine tank 35. Refrigerant evaporator coils (not shown) are contained within the brine tank 35 and connected with an evaporating chamber 36. Refrigerant pipes 37 and 38 connect the evaporating chamber with the compressor 22 the pipe 37 being the high pressure line through which the refrigerant is pumped from the condenser to the evaporator chamber 36 and the pipe 38 being the low pressure line through which the refrigerant is drawn from the chamber 36 to the compressor.

The electric motor is controlled by a controller 40. Controller 40 comprises a member forming a reservoir or chamber 47 and a bracket 41 by which the controller is secured by screws 41*a* to the brine tank cradle 32. A snap switch 42 for controlling an electrical circuit is carried by said bracket member. Wires 43 and 44 lead to a terminal plug 46 which in turn is connected to said switch 42. Wire 44 is connected with the motor 23 while wire 43 and wire 45, also connected with the motor, are connected to a current source.

The reservoir 47 is flared outwardly as at 48 to form a chamber 49. A diaphragm 50 forms a wall for the upper part of the chamber 49. Diaphragm 50 supports a plunger rod 51 extending through an adjustable bushing 52 screwed into an abutment 53. The abutment 53 and diaphragm 50 are secured in place by screws 54. A spring 56 is interposed between the bushing 52 and the diaphragm 50 and normally bears downwardly against the diaphragm 50. Rod 51 is connected by a link 57 with the controller rod 58 of the snap switch 42. Controller rod 58 is provided with flanges 59 and 60 which are spaced and into which space the forked end 61 of the link 57 extends. Switch 42 carries a bracket 62 to which the link 57 is fulcrumed as at 63. Snap switch 42 is carried by the bracket 41 and held in place by one of the bolts 54 and bolt 64.

The reservoir 47 contains a quantity of water the upper level of which is indicated at 65. The controller 40 is carried adjacent the brine tank 35 where the temperature is such that the liquid within the reservoir 47 will freeze. The freezing of the liquid will cause same to expand and compress the air within the chamber 49. The compressed air, or other medium in the chamber 49 acting on the diaphragm 50 will bend same upwardly causing the rod 51 to actuate the controller rod 58 through link 57 and thereby actuate the snap switch 42 to interrupt the circuit between wires 43 and 44.

When the contents of the reservoir 47 are in a liquid state, the spring 56 will have returned the snap switch to closed position as shown in Fig. 2. Current will be supplied to the motor 23 through the wires 43, snap switch 42, wire 44, on the one side of the line and by wire 45 to the other side of the line. The motor 23 will then drive the compressor 22 to draw refrigerant gas from the evaporator chambers 36 through the pipes 38 to cool the brine tank and likewise brine compartment chamber 26 and food compartment chamber 25, the convectional current of air passing through the passages 29 and 30. When a certain low temperature has been reached the liquid in the reservoir 47 will freeze again and thereby cause the motor to cease operation.

The tension of spring 56 upon the diaphragm 50 is adjusted by turning the bushing 52. A cover 65 is provided for the controlling mechanism which is readily removable.

Access may be had to the controller from the front of the refrigerator cabinet, therefore the controller can be readily adjusted or repaired. If desirable the entire controller can be removed by removing plug 46 and screws 41*a*.

The pressure within the reservoir 47 can be varied by raising or lowering the water level 65. This is done by screwing a bolt 67 in or out of the reservoir 47. The bolt 37 is locked into position by a nut 68. Or if desirable the bolt 67 can be omitted and water added or taken out as may be necessary for the correct operation of the switch. In this manner the range of response of the controlling apparatus to temperature changes can be raised or lowered.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What is claimed is as follows:

1. A control for refrigerating systems comprising a chamber containing a substance to be frozen, and a substance remaining in the gaseous phase throughout the temperature cycle, said chamber comprising a flexible wall, and means suddenly responsive to expansion of the substance to be frozen for controlling the operation of the refrigerating system.

2. A control for refrigerating systems comprising a chamber containing a substance to be frozen, and a substance remaining in the gaseous phase throughout the temperature cycle, said chamber comprising a flexible wall, means suddenly responsive to expansion of the substance to be frozen, and means to adjust the space within said chamber independently of the flexure of said flexible wall.

3. In combination means tending to assume suddenly one of two positions on either side of a neutral point and means for urging said first named means from one point to the other comprising a container with a gas to remain in the gaseous phase throughout the entire temperature cycle of operation, and a substance tending to change between the liquid and solid phases during said cycle.

4. A control for mechanical refrigerators comprising a snap switch, means for operating the switch and a gas cushioned substance freezing and melting within the temperature cycle of operation of the refrigerator for moving such operating means.

5. A mechanical refrigerating system adapted to operate in temperature cycles, and means for controlling the cycles including an enclosed liquid in the presence of a permanently enclosed gas, said liquid being adapted to freeze and melt during each cycle.

HARRY B. HULL.